Aug. 18, 1964 G. G. BUDWIG 3,144,695

MOUNTING DEVICE

Filed April 24, 1961 2 Sheets-Sheet 1

INVENTOR.
GILBERT G. BUDWIG
BY Lyon & Lyon
ATTORNEYS

INVENTOR.
GILBERT G. BUTWIG
BY Lyon & Lyon
ATTORNEYS

United States Patent Office 3,144,695

Patented Aug. 18, 1964

3,144,695
MOUNTING DEVICE

Gilbert G. Budwig, 3400 Bayside Walk, San Diego, Calif.

Filed Apr. 24, 1961, Ser. No. 104,872
10 Claims. (Cl. 24—213)

This invention relates to mounting devices, and included in the objects of this invention are:

First, to provide a mounting device which includes a strap element adapted to be formed into a loop, and which incorporates novel fastening means whereby the loop may be readily and quickly secured to a wall or other surface having an accommodation perforation therein, the loop being adapted for wrapping about a cable, or cable-like member, to provide a support therefor.

Second, to provide a mounting device which includes coacting members, one of which is insertable into a perforation and the other of which is engageable therewith to prevent removal of the first member from the opening, and wherein these members are connected by a mounting strap.

Third, to provide a mounting device formed as a single member of yieldable plastic material, one embodiment of which includes an expandable sleeve element having a yieldable internal flange and a pin element adapted to be forced therein to distort the internal flange and expand the sleeve so as to secure the sleeve within an aperture, and a loop forming strap connects the sleeve and pin.

Fourth, to provide a mounting device of this type wherein both the sleeve and the pin may be tubular, so that the mounting device may also serve as a grommet.

Fifth, to provide a mounting device formed as a single member of yieldable plastic material which includes a plug element insertable through an aperture, the plug element having a transverse perforation with a retainer tongue therein, and a strap which extends from the plug and is adapted to form a loop by insertion through the perforation for retaining engagement by the tongue.

With the above and other objects in view, as may appear hereinafter, reference is directed to the accompanying drawings in which.

Figure 1:
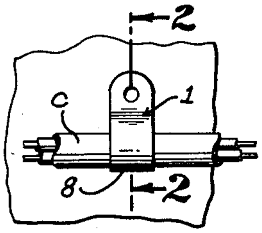
FIGURE 1 is an elevational view showing one form of the mounting device as it appears when mounted on a wall and supporting a cable.

Reference is first directed to FIGURES 1 through 6. The structure here illustrated includes a retainer or mounting strap 1, which may be flat and of uniform width throughout its length but may be otherwise formed, depending upon the purpose for which the mounting strap is to be used. Formed integrally at one end of the mounting strap and extending from one surface thereof is a sleeve 2, the extended portion of which is provided with an internal flange 3. The external diameter of the sleeve 2 is smaller than the strap 1 so that the end of the strap forms a flange 1*a*.

Extending from the opposite side of the remaining end of the strap 1 is a pin 4 having a rounded or semi-spherical end 5. Adjacent the end 5 the pin is provided with an external annular bead or rib 6. The pin 4 is also smaller than the width of the strap 1 so that this end of the strap forms a flange 1*b*. The pin 4 may be solid or may be provided with a small recess 7 extending therein from its root end.

The entire structure thus described is molded as a single piece of plastic material; that is, the sleeve 2 and the pin 4 are integral with the strap. Various plastic materials may be utilized. The plastic material should be capable of limited stretching without permanent deformation. For example, but not by way of limitation, polyethylene, polypropylene, polyvinylchloride, nylon, and similar types of palstic may be used.

Figure 2:
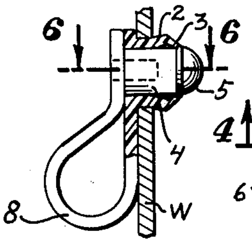
FIGURE 2 is an enlarged, partial sectional, partial elevational view taken through 2—2 of FIGURE 1 with the cable omitted.
Figures 3, 4:
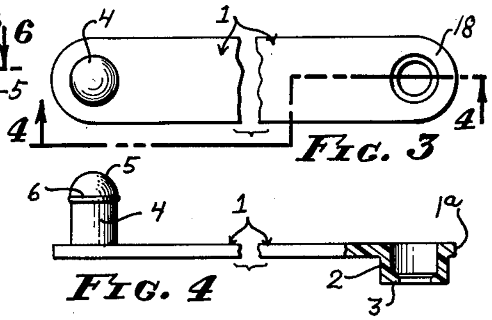
FIGURE 3 is an elevational view of the embodiment of the mounting device shown in FIGURE 1, the device being shown in its extended condition.
FIGURE 4 is a partial sectional, partial side view thereof taken substantially through 4—4 of FIGURE 3.
Figures 5, 6:
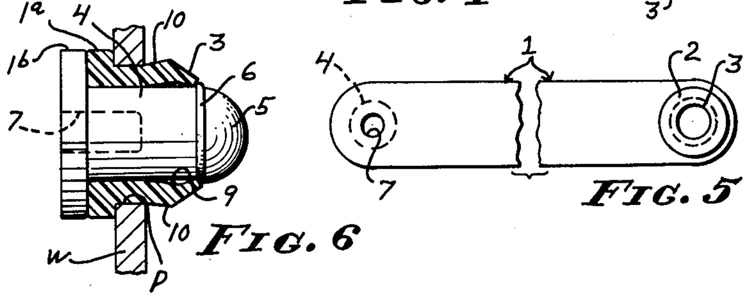
FIGURE 5 is a view similar to FIGURE 3, but showing the opposite side of the mounting device.
FIGURE 6 is a further enlarged, sectional view taken through 6—6 of FIGURE 2 with the pin member shown in elevation.

The mounting device illustrated in FIGURES 1 through 6 is employed as follows:

The sleeve 2 is adapted to fit within a perforation P formed in a wall W of sheet material. The size of the perforation is such as to snugly receive the sleeve 2. The axial length of the sleeve is such as to project through the wall W; that is, to place the internal flange 3 beyond the back side of the wall as shown in FIGURES 2 and 6. Upon insertion of the sleeve 2 into the wall W, the strap 1 is folded upon itself to form a loop 8 which becomes a closed loop when the pin 4 is inserted into the sleeve 2.

It will be noted that, as shown in FIGURES 2 and 6, the pin 4 forms a snug sliding fit with the bore of the sleeve so that some stretching of the sleeve is required to force the bead 6 to the internal flange 3. The bead thus provides a moderate frictional contact for temporarily retaining the pin in the sleeve.

The relative lengths of the pin and sleeve are such that the distance between the strap 1 and the bead 6 is slightly greater than the full length of the bore through the sleeve and strap, so that the bead 6 may be forced through the internal flange 3 and stretch the flange as well as deflect the flange axially as shown in FIGURES 2 and 6. The flange 3, on being stretched and axially deflected, causes the sleeve 2 to form an internal channel 9 and a corresponding external annular rib.

The presence of the internal flange of course, requires a greater force in order to cause the bead to penetrate the flange than is required to move the bead through the normal diametered portion of the bore. The proportions of the sleeve and pin and their respective flange and bead are such that, even though greater force is required to cause the bead to penetrate the flange, it does not exceed that which may be applied by hand. That is, the pin may be hand-pressed fully into the sleeve, and, once the bead has penetrated the flange, the connection between the pin and sleeve and the connection between the sleeve and the wall in which the device is mounted readily withstands the loads imposed in use.

The mounting device may be disassembled by pressing on the rounded end of the pin 4, or by applying a screw driver or other wedging implement between the adjacent flanged ends 1*a* and 1*b* of the strap 1.

If the bead is not forced through the flange, the pin is retained with a lesser force so that the loop formed by the strap may be repeatedly opened and closed to permit ready insertion or removal of wires, should this be desirable.

Figure 7:
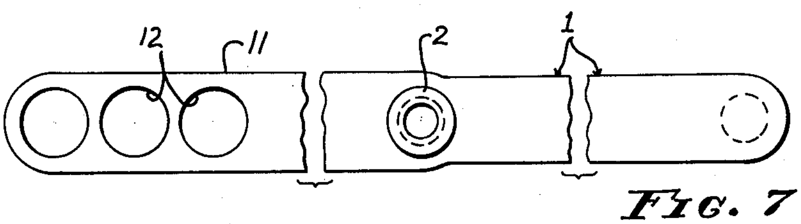
FIGURE 7 is an extended view similar to FIGURE 5, showing a modified form of the mounting device.
Figure 8:
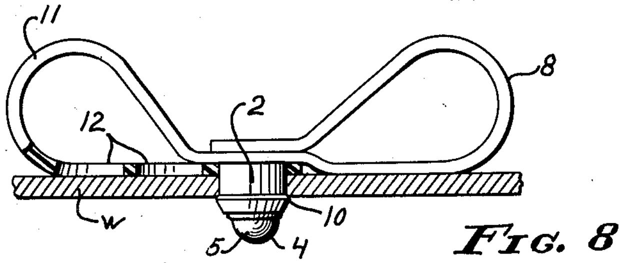
FIGURE 8 is a partial sectional, partial side view thereof showing the modified mounting device as it appears in use.

Reference is now directed to FIGURES 7 and 8. The construction here illustrated is similar to the first described structure with the addition of a second strap 11, which is preferably wider than the strap 1, and is provided with a series of perforations 12 dimensioned to fit over the sleeve 2. The strap 11 extends in a direction diametrically opposite from the strap 1.

The modified structure is employed in the same manner as the first described structure with the additional feature that the second strap 11 is formed into a loop which is fitted over the sleeve 2 prior to insertion of the sleeve in the perforation P. For a given wall thickness the axial length of the sleeve 2 is increased to accommodate the extra thickness of the second perforated strap 11.

Figure 9:
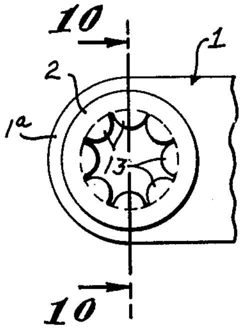
FIGURE 9 is a fragmentary end view of a further modified form of the mounting device.
Figure 10:
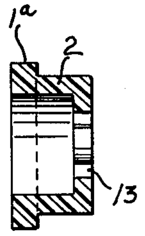
FIGURE 10 is a sectional view thereof taken through 10—10 of FIGURE 9.

Reference is now directed to FIGURES 9 and 10. In the construction here illustrated, the sleeve 2 is provided with a ring of internal semi-circular fingers 13 in place of the continuous internal flange 3.

These fingers spread radially and extend axially to permit penetration of the bead 6, and, in doing so, stretch the sleeve 2. That is, the internal flange 3 and ring of fingers 13 both form an internal construction which cooperates with the bead 6 to stretch the sleeve 2.

Figure 11:
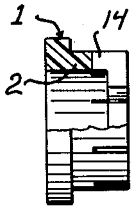
FIGURE 11 is a partial sectional, partial end view of a further modified form of the mounting device.

Reference is directed to FIGURE 11. This construction is similar to FIGURES 9 and 10, except that slits 14 are formed between the internal fingers 13, these slits extending into the side walls of the sleeve 2.

Figure 12:
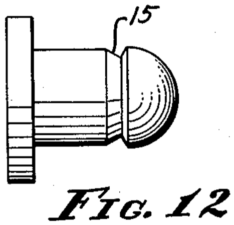
FIGURE 12 is an end view showing a modified form of retainer pin used in the mounting device.

The construction shown in FIGURES 9, 10, and 11 is particularly adapted for mounting devices of larger size than the construction shown in FIGURES 1 through 6. The modified sleeves with internal fingers may be utilized with the pin 4 having the bead 6, or may be utilized with the pin 4 having an annular groove 15 in place of the bead 6, as shown in FIGURE 12. With this arrangement, the sleeve 2 and pin 4 may be so relatively proportioned that the fingers 13 tend to fit into the groove 15 to resist retraction of the pin. In fact, the proportions may be such that although the pin may be readily inserted, a substantially greater force is required to extract the pin.

Figures 13, 14, 15, 16, 17, 18, 19, 20, 21, 22:
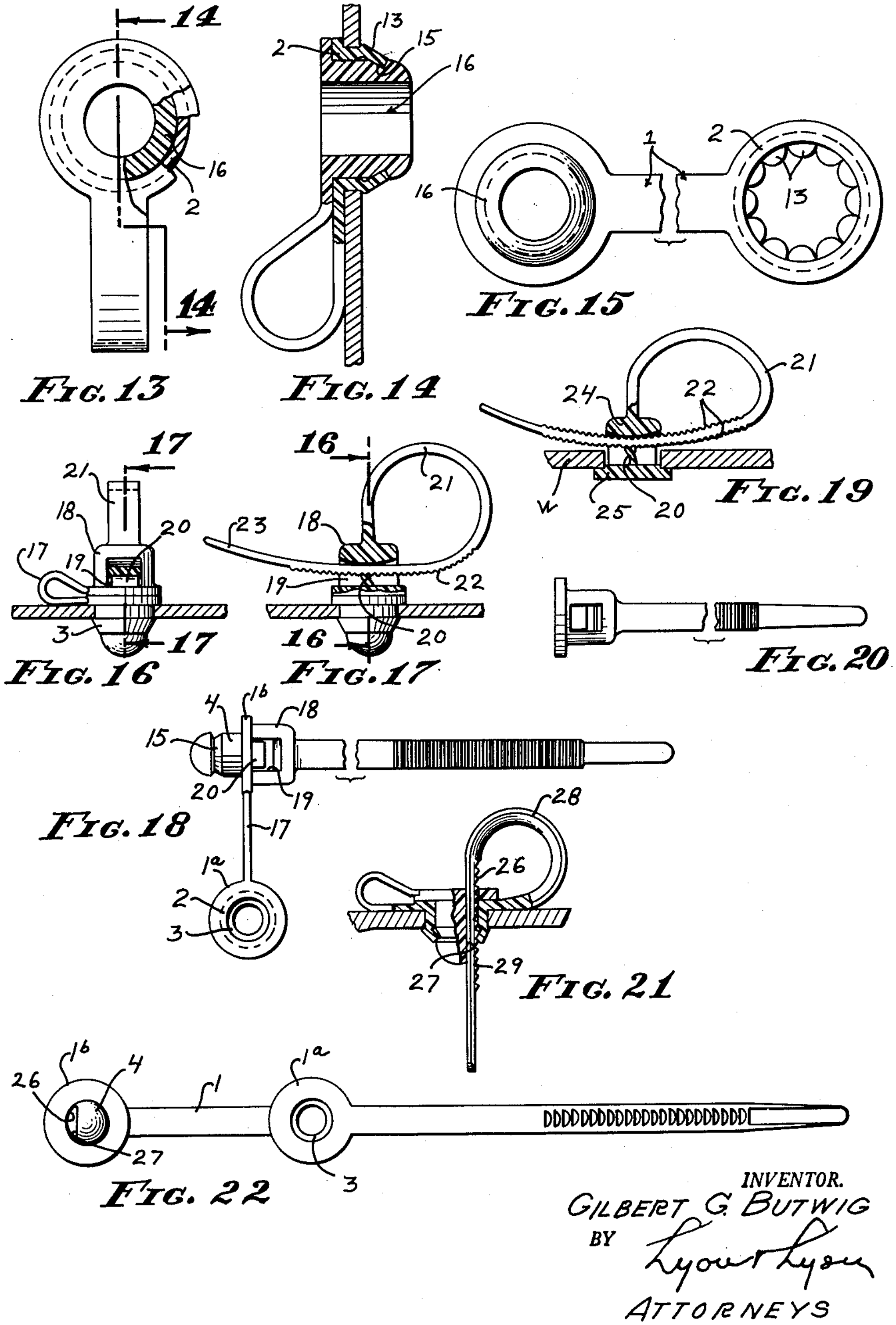
FIGURE 13 is a partial sectional, partial elevational view of a still further modified form of the mounting device in which the retainer pin is tubular.
FIGURE 14 is a partial sectional, partial elevational view thereof taken through 14—14 of FIGURE 13.
FIGURE 15 is a fragmentary plan view thereof.
FIGURE 16 is a partial elevational, partial sectional view of a further modified form of the mounting device taken through 16—16 of FIGURE 17.
FIGURE 17 is a partial elevational, partial sectional view thereof taken through 17—17 of FIGURE 16.
FIGURE 18 is a developed plan view thereof, showing the parts as they initially appear before being arranged for use.
FIGURE 19 is a partial sectional, partial elevational view similar to FIGURE 17, showing a further modification of the mounting device as it appears in use.
FIGURE 20 is a fragmentary, developed view thereof as it appears before being arranged for use.
FIGURE 21 is a partial sectional, partial elevational view similar to FIGURE 17, showing a further modified form of the mounting device as arranged for use.
FIGURE 22 is a developed view thereof as the modified device appears before use.

Reference is now directed to FIGURES 13, 14, and 15, which illustrate an application of the construction shown in FIGURES 9 through 12 but may be adapted to the construction shown in FIGURES 1 through 6. More particularly, the sleeve 2 is relatively large in diameter, and a tubular pin 16 is substituted for the pin 4 and may be provided with either the bead 6 or the annular groove 15. This arrangement forms a grommet through which cables or other members may be extended, and in addition provides a mounting loop.

Reference is directed to FIGURES 16, 17, and 18. The construction here illustrated is similar to the first described structure except that in place of the strap 1 the sleeve 2 and pin 4 are connected by an integral, flexible rod 17, which may be circular in cross section and serves primarily as a means for maintaining the sleeve and pin together prior to installation. The rod 17, while formed into a loop upon installation, need not be utilized as a mounting strap although this function is not predetermined.

It will be noted that the flanges 1*a* and 1*b* which form the ends of the strap 1 are retained in the construction shown in FIGURES 16, 17, and 18. In addition there is formed on the flange 1*b*, opposite from the pin 4, a boss 18 having a transverse aperture 19. Within the transverse aperture is a flexible tongue 20. Extending from the boss 18 is a retainer or mounting strap 21, of any desired length, which is provided with serrations 22 along one or both sides and which terminates in a tab 23.

The mounting device shown in FIGURES 16, 17, and 18 is utilized as follows:

The device is secured to a wall in the same manner as the first described structure by insertion of the pin 4 into the sleeve 2. When it is desired to use the device to secure a cable, or the like, the strap 21 is looped about the cable and the tab 23 inserted through the aperture 19. The strap is then constricted by drawing on the tab 23. This movement deflects the tongue 20, as shown in FIGURE 17, so that any attempt to withdraw the strap causes the tongue to engage in the serrations 22.

By reason of the fact that the mounting device is formed in its entirety from flexible plastic material, it is possible to forcibly withdraw the mounting strap; but the effort required to reverse the position of the flexible tongue is greater than the effort required to cinch the strap, so that the strap can be depended upon to function as a retaining member.

Reference is directed to FIGURES 19 and 20. The construction here illustrated is essentially that portion which was added to the first described structure in order to form the structure shown in FIGURES 16, 17, and 18. Stated otherwise, the boss 18 becomes essentially a plug 24 which may be inserted through the backside of the wall W.

The plug 24 is provided with a flange 25 so that it cannot pass through the perforation P. After the mounting strap has been looped and thrust through the transverse aperture 19, the plug 24 cannot be withdrawn from the wall.

It will be observed that if the serrations 22 are placed on both sides of the mounting strap 21, it may be looped in either direction through the transverse aperture 19; whereas, if the serrations are arranged on only one side, then the strap 21 must be looped in only one direction as represented in FIGURE 17.

Reference is now directed to FIGURES 21 and 22. The construction here illustrated is essentially the same as the first described structure with the modification that the flange 1*b* is provided with a slot 26, and a mating groove 27 is formed along one side of the pin 4. Thus when the pin 4 is inserted in the sleeve 2 there is formed a passageway for the insertion of a strap.

Attached integrally to the flange 1*b* is a retainer or mounting strap 28 having a cross section corresponding to the cross section of the slot 26 and having serrations 29 corresponding to the serrations 22. The mounting strap 28 is therefore adapted to be inserted in the slot 26 and groove 27, so that the serrations 29 coact with a portion of the internal flange 3 or one of the internal fingers 13, as the case may be.

While particular embodiments of this invention have been shown and described, it is not intended to limit the same to the exact details of the constructions set forth, and it embraces such changes, modifications, and equivalents of the parts and their formation and arrangement as come within the purview of the appended claims.

What is claimed is:

1. A mounting device formed of yieldable and stretchable plastic material, and adapted for installation in a panel having an accommodation aperture, said device comprising:

(a) a slot-free sleeve having an external flange at its first end and an internal flange at its second end;

(b) said internal flange forming, initially, an axially outer surface flush with said second end, and the outer surface of said sleeve initially forming with its second end a relatively sharp corner;

(c) said internal flange also initially forming at the intersection of its axially inner and radially inner surfaces a relatively sharp internal corner;

(d) said internal flange being axially deflectable and radially expansible, to cause the surrounding end portion of said sleeve to expand into an external flange of essentially V-shaped profile;

(e) a pin having a flange at its one end and a shoulder at its second end;

(f) said pin fitting snugly and slidably in the bore of said sleeve, and adapted to be forced axially against said internal flange to expand said sleeve for anchorage in said aperture;

(g) the axial distance of said pin between its flange and its shoulder being sufficiently greater than the initial distance between the first end of said sleeve and said internal corner to cause said internal corner to extend axially, on insertion of said pin, and engage behind said shoulder with the initially, radially inner surface of said internal flange bearing against said shoulder to lock said pin in said sleeve.

2. A mounting device as set forth in claim 1, wherein:
(a) said internal flange is continuous.

3. A mounting device as set forth in claim 1, wherein:
(a) said internal flange is provided with a plurality of slits.

4. A mounting device as set forth in claim 1, wherein:
(a) said pin is tubular.

5. A mounting device as set forth in claim 1, wherein:
(a) a strap interconnects the external flanges of said pin and sleeve.

6. A mounting device formed of yieldable and stretchable plastic material, and adapted for installation in a panel having an accommodation aperture, said device comprising:

(a) a pin having a flange at one end and a shoulder adjacent its other end;

(b) a slot-free stretchable sleeve having an external flange at one end, an internal flange at its other end, and a bore therebetween slidably and snugly receiving said pin;

(c) said internal flange being essentially cylindrical in cross section, of short axial dimension with respect to its diameter, and forming at the juncture of its axially inner surface and radially inner surface a corner engageable by said pin to distort said flange axially;

(d) the axial dimension of said pin between its flange and its shoulder being greater than the length of said sleeve to said corner, when said corner is distorted, to permit passage of said shoulder beyond said corner for engagement thereby;

(f) said internal flange, when axially distorted to receive said pin, effecting radial expansion of the adjacent end of said sleeve to secure said sleeve in said aperture, and defining a cone frustum of short axial length behind said shoulder to form a compression-resisting element to prevent retraction of said pin.

7. A mounting device as set forth in claim 6, wherein:
(a) said internal flange is continuous.

8. A mounting device as set forth in claim 6, wherein:
(a) said internal flange is provided with a plurality of slits.

9. A mounting device as set forth in claim 6, wherein:
(a) said pin is tubular.

10. A mounting device as set forth in claim 6, wherein:
(a) a strap interconnects the external flanges of said pin and sleeve.

References Cited in the file of this patent

UNITED STATES PATENTS

| | | |
|---|---|---|
| 800,050 | Ayres | Sept. 19, 1905 |
| 2,555,420 | Richardson | June 5, 1951 |
| 2,703,359 | Miller | Mar. 1, 1955 |
| 2,937,834 | Orenick | May 24, 1960 |
| 2,948,937 | Rapata | Aug. 16, 1960 |
| 2,956,468 | Macy | Oct. 18, 1960 |
| 2,969,216 | Hallsey | Jan. 24, 1961 |
| 2,974,916 | Richey | Mar. 14, 1961 |
| 3,049,771 | Litwin et al. | Aug. 21, 1962 |
| 3,053,046 | Fleming | Sept. 11, 1962 |